(12) United States Patent
Eguchi et al.

(10) Patent No.: US 6,382,839 B1
(45) Date of Patent: May 7, 2002

(54) ADAPTER FOR ABUTTING AND CONNECTING CONFRONTING OPTICAL CABLES

(75) Inventors: Toshiaki Eguchi; Yasuaki Ohkubo; Seigo Takahashi, all of Tokyo (JP)

(73) Assignees: NEC Corporation; Honda Tsushin Kogyo Co., Ltd., both of Tokyo (JP)

( * ) Notice: Subject to any disclaimer, the term of this patent is extended or adjusted under 35 U.S.C. 154(b) by 0 days.

(21) Appl. No.: 09/497,763

(22) Filed: Feb. 4, 2000

(30) Foreign Application Priority Data

Feb. 16, 1999 (JP) ............................................. 11-037048

(51) Int. Cl.[7] ................................................. G02B 6/38
(52) U.S. Cl. ......................................................... 385/56
(58) Field of Search .............................. 385/56, 58, 59, 385/60, 62, 81, 136, 137

(56) References Cited

U.S. PATENT DOCUMENTS

| | | | | |
|---|---|---|---|---|
| 4,741,590 A | * | 5/1988 | Caron | ..................... 350/96.21 |
| 6,213,649 B1 | * | 4/2001 | Omiya et al. | ................. 385/60 |

* cited by examiner

Primary Examiner—Cassandra Spyrou
Assistant Examiner—Alessandro V. Amari
(74) Attorney, Agent, or Firm—Rader, Fishman & Grauer, PLLC

(57) ABSTRACT

Disclosed is an improved adapter for end-to-end abutting and connecting the ferrules of confronting optical cables. It uses resilient means which cooperates with the collars of the ferrules to cause the confronting ferrules to abut on each other as a counter action of the stretching or compressing of the resilient means, thus assuring that the confronting optical cables be put in good connection. The adapter is appropriate for mounting on a printed circuit board, and is simple in structure, small in size and less expensive.

8 Claims, 5 Drawing Sheets

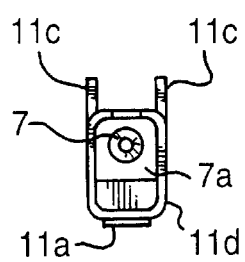
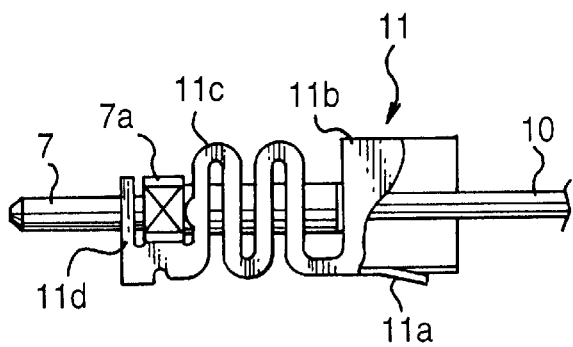
FIG.12a  FIG.12b
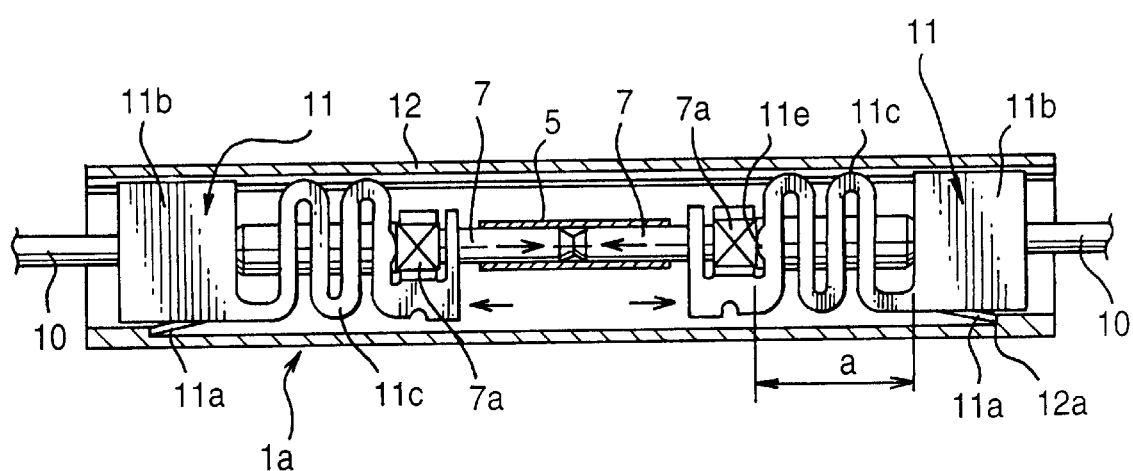
FIG.13

ADAPTER FOR ABUTTING AND CONNECTING CONFRONTING OPTICAL CABLES

BACKGROUND OF THE INVENTION

1. Field of the Invention

The present invention relates to an adapter for abutting and connecting confronting optical cables, and more particularly to an adapter for abutting confronting optical cables, which are laid on a given printed circuit board, by applying a predetermined pressure to the end of each of the confronting optical cables.

2. Related Arts

A conventional optical cable connector comprises a split metal sleeve in which the terminal ferrules of the confronting optical cables are to be press-fitted by inserting them in the opposite ends of the sleeve, and a synthetic resin holder having the sprit metal sleeve held therein. The holder has catch pieces formed thereon for catching the plug frame of each ferrule.

The plug structure of each ferrule comprises a synthetic resin plug frame in which the ferrule is spring-biased and contained, and a rubber hood or thumb piece attached to the plug frame.

The conventional optical cable plug or connector has numerous parts to be assembled, and is complicated in structure. Also, it is large in size, and when it is required that an increased number of optical cables are mounted on a printed circuit board, almost intolerably large space is occupied in the limited area. As a recent tendency electronic and optical devices are mounted in a limited space at an increasing density, leaving a minimum space available for mounting optical cables.

Therefore, there has been an ever increasing demand for a small-sized, less complicated and less expensive adapter for optical cable connection.

SUMMARY OF THE INVENTION

One object of the present invention is to provide an optical cable connection adapter which is small in size, simple in structure and less expensive.

According to one aspect of the present invention an adapter for end-to-end abutting and connecting the ferrules of confronting optical cables, each ferrule having a collar at its rear end, comprises: a sleeve holder for containing a split sleeve in its inner space, the split sleeve having the ferrules of the confronting optical cables press-fitted therein, the sleeve holder having a center collar formed at its midpoint; and a holder for containing the sleeve holder along with the split sleeve with the sleeve holder caught by the center collar in the holder, the holder having resilient means fixed therein to grip the collars of the confronting ferrules, thereby pushing and pulling the confronting ferrules toward each other to retain the confronting optical cables in connecting position.

The holder may be a trough-like object having a "U"-shaped cross section, comprising an elongated bottom and two opposite upright side walls, each having center notches formed at its midpoint to catch the center collar of the sleeve holder, and catch sections formed at its opposite ends to catch the engagement pieces of the resilient means, the elongated bottom of the holder having foot pieces integrally connected to its opposite ends.

The resilient means can grip the collars of the confronting ferrules to push and pull the confronting ferrules toward each other, thereby making the confronting ferrules to abut on each other in the split sleeve.

The resilient means may be adapted to be contained in the trough-like holder, which has catch means formed at the midpoint of each upright side wall, thus catching the collar of the sleeve holder to prevent the sleeve holder from moving upward and slipping apart from the holder, each side wall having windows at its opposite ends, thus permitting the engagement pieces of the resilient means to project outward from the windows of the side walls, the resilient means being allowed to be laid longitudinally on the inside each of the opposite side walls, extending from each end to the midpoint of each side wall, at which midpoint the center collar of the sleeve holder is positively held.

According to another aspect of the present invention an adapter for end-to-end abutting the ferrules of confronting optical cables, each ferrule having a collar at its rear end, is improved according to the present invention in that it comprises: a split sleeve in which the ferrules of the confronting optical cables are to be press-fitted; a holder for containing the split sleeve in its inner space; and resilient means which is to be caught and fixed in the holder to grip the collars of the confronting ferrules in the holder, thereby pushing the confronting ferrules toward each other to retain the confronting optical cables in connecting position.

With the arrangement described above the resilient means cooperates with the holder so that the ferrules of confronting optical cables may be positively pushed on each other within the split sleeve. Thus, the confronting optical cables are spring-biased to be retained in abutting condition all the time. The parts to keep the confronting optical cables abutting on each other include the split sleeve, the holder with or without the sleeve holder contained therein and the resilient means, requiring nothing else. Thus, a small-sized, light-weight and less-expensive adapter for optical connection may be provided. Still advantageously it requires a minimum occupation space. Thus, the mounting of optical cables on a printed circuit board is permitted even though numerous devices and parts have been already mounted thereon at an increased density.

Other objects and advantages of the present invention will be understood from the following description of adapters for optical cable connection according to preferred embodiments of the present invention, which are shown in accompanying drawings.

BRIEF DESCRIPTION OF THE DRAWING

FIG. 7*a* is a front view of a sleeve holder, showing the upper half in section whereas

FIG. 8*a* is a front view of another sleeve holder, showing the upper half in section whereas

FIG. 12a is an end view of the resilient means-and-ferrule assembly of an adapter according to a third embodiment whereas FIG. 12b is a front view of the same; and FIG. 13 is a longitudinal section of the adapter for optical cable connection according to the third embodiment.

DETAILED DESCRIPTION OF PREFERRED EMBODIMENT

Figure 7A:
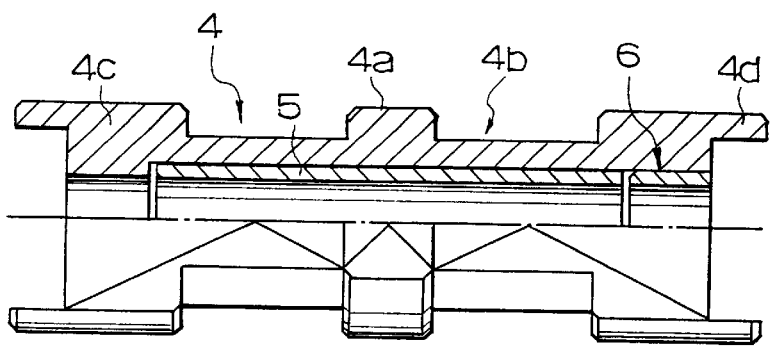
Figure 7B:
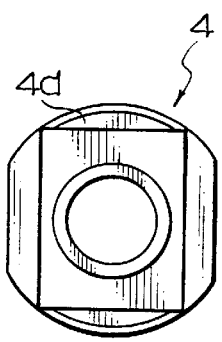
FIG. 7*b* is an end view of the sleeve holder.
Figure 8A:
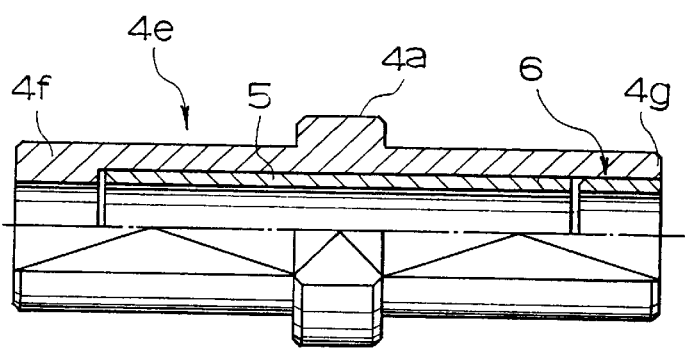
Figure 8B:
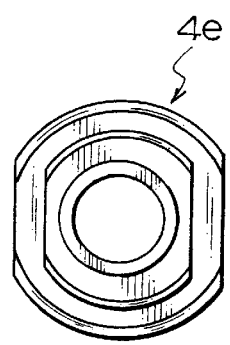
FIG. 8b is an end view of the sleeve holder.

Referring to FIGS. 1 to 8, an adapter 1 for end-to-end abutting the ferrules of two confronting optical cables comprises a holder 2, resilient means 3 (see FIGS. 1 to 6) and a sleeve holder 4 (see FIGS. 7 and 8). The holder 2 is a trough-like holder 2d having a "U"-shaped cross section, comprising an elongated bottom 2a and two opposite upright side walls 2b and 2c. It is made of a metal sheet such as stainless steel sheet, which is 0.2 mm thick, 22 mm long and 3 mm wide.

As shown, each side wall 2b or 2c has a center notch 2e formed at its midpoint to catch the center collar 4a of a sleeve holder 4 as later described. The center notch 2e is somewhat wider than the width of the center collar 4a. Also, each side wall 2b or 2c has catch sections 2f formed in the vicinity of the opposite ends to catch the engagement pieces 3a of the resilient means 3. For example, the catch section 2f is provided in the form of square window.

The elongated bottom 2a of the holder 2 has foot pieces 2g integrally connected to its opposite ends, thus permitting application of the holder to a printed circuit board. The rectangular foot piece 2g may have a tapped hole for fastening to the printed circuit board by an associated bolt. Otherwise, it may be like a pin to be inserted in an associated hole, which is made in the printed circuit board.

Figure 1:
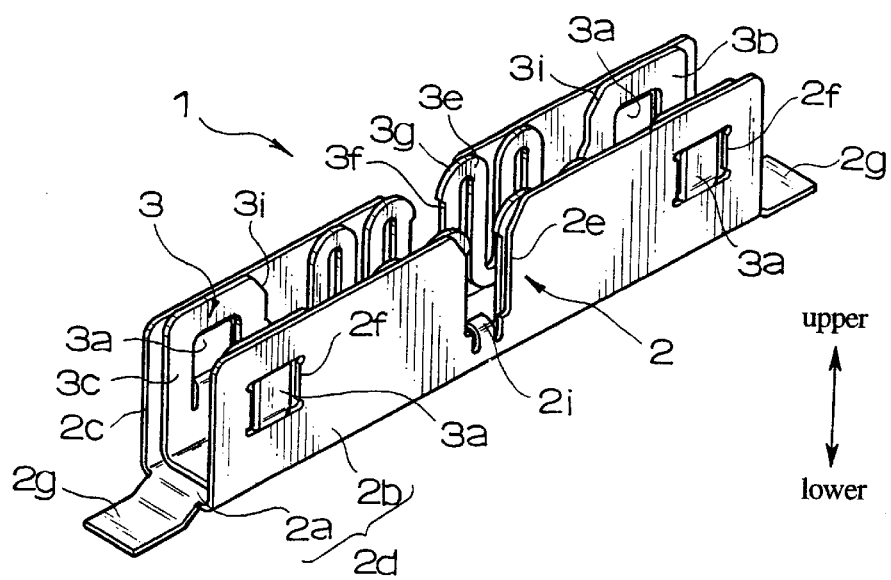
FIG. 1 is a perspective view of the holder-and-resilient means assembly of an adapter for optical cable connection according to a first embodiment of the present invention.
Figure 2:
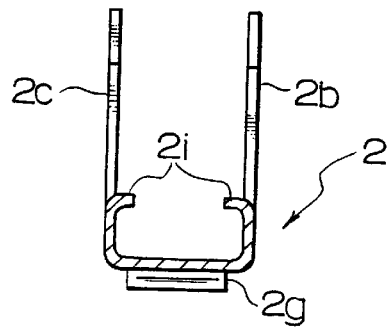
FIG. 2 is a cross section of the holder taken at its mid point.

Catch means 2i is formed at the midpoint of each upright side wall by turning a short projection of the bottom edge of the center notch 2e inward, thereby catching the resilient means 3 to prevent it from moving upward and slipping apart from the holder 2, as seen from FIG. 2. The center notch 2e is divergent on its open side, thus facilitating insertion of the central collar 4a of the sleeve holder 4. Each side wall 2b or 2c has windows at its opposite ends, thus permitting the engagement pieces 3a of the resilient means to project outward from the windows as described later.

Figure 3:
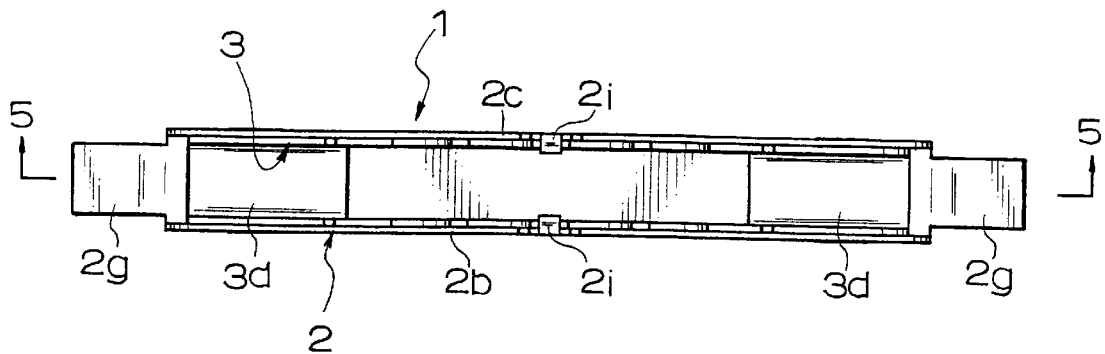
FIG. 3 is a plane view of the holder-and-resilient means assembly.
Figure 4:
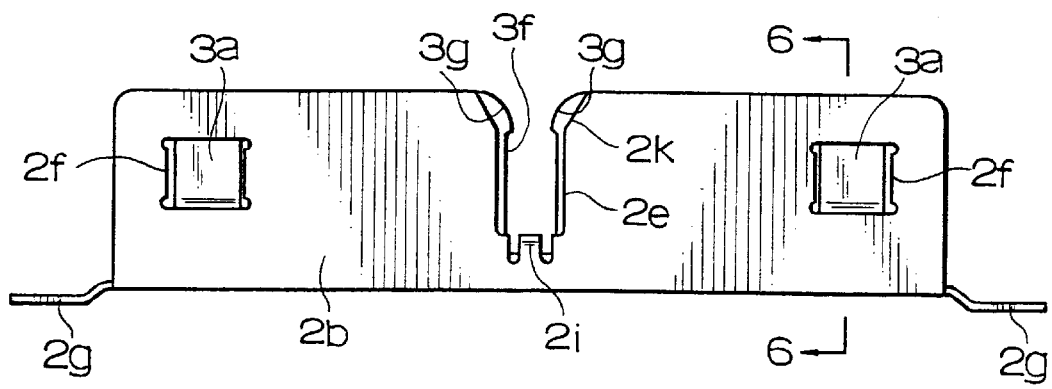
FIG. 4 is a front view of the holder-and-resilient means assembly.
Figure 5:
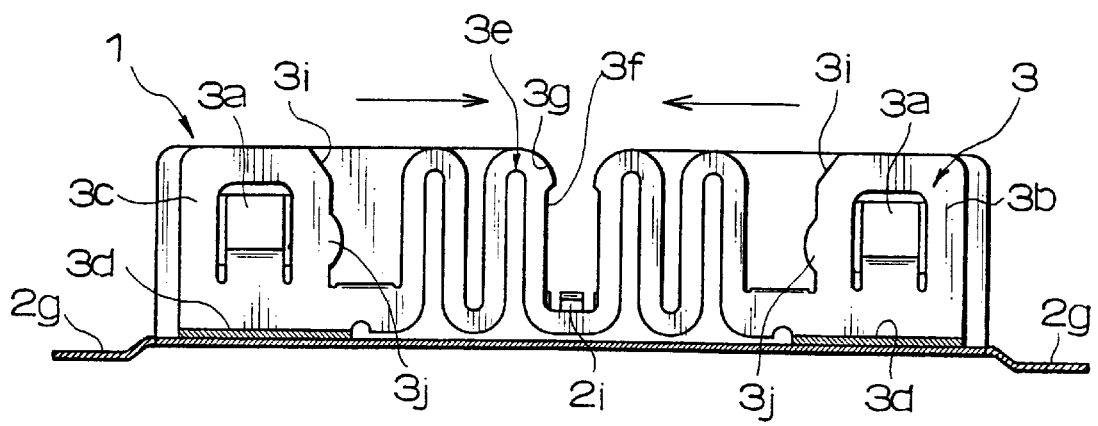
FIG. 5 is a longitudinal section of the holder-and-resilient means assembly taken along the line 5—5 in FIG. 3.
Figure 6:
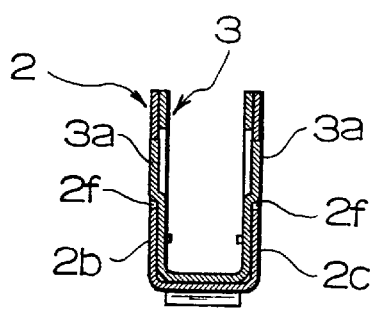
FIG. 6 is a cross section of the holder-and-resilient means assembly taken along the line 6—6 in FIG. 4.

Referring to FIGS. 3 to 5, the resilient means 3 is laid longitudinally on the inside of each side wall of the holder 2, extending from each end to the midpoint of the side wall, at which midpoint the center collar 4a of the sleeve holder 4 is to be positively held. The resilient means 3 is a strip of stamped metal sheet, comprising two lines each like a row of U's and inverted U's (like a sinusoidal or wavy form) 3e and two pieces each having a "U"-shaped cross section. Each "U"-shaped piece has a catch projection 3a pressed out from its major plane by a distance equal to the thickness of the stamped metal sheet. Each "U"-shaped catch piece is integrally connected to each end of each of the opposite wavy forms, thus integrating the opposite wavy forms by the bottom 3d of the "U"-shaped catch piece.

The resilient means 3 is snuggly accommodated in the trough-like holder 2 with its opposite catch projections 3a loosely fitted in the square openings 2f of the opposite side walls 2b and 2c. More specifically in this position each wavy form 3e is laid on the inside of each side wall to pull its ends 3b and 3c toward the midpoint of the wavy form 3e all the time as indicated by arrows in FIG. 5, leaving no gap between the inner side of each square catch projection 3a and the counter side of the square opening 2f.

The center "U" section 3f of each wavy form 3e has a width almost equal to the width of the center collar 4a of the sleeve holder 4, thus permitting the center collar 4a of the sleeve holder 4 to be snuggly accommodated therein. The center "U" section 3f has opposite catch projections 3g formed inward to catch the center collar 4a of the sleeve holder 4. The outer contours of the transient curved portions of the center "U" section 3f to the opposite halves of the wavy form open so wide that insertion of the center collar 4a of the sleeve holder 4 may be facilitated.

As seen from FIG.5, each "U"-shaped catch piece 3b has a projection-and-inclination contour 3j and 3I formed on its inner sides. Thus, between the projection-and-inclination contour of each "U"-shaped catch piece 3b and the outer leg side of the proximal inverted "U" of each of the opposite wavy forms defined is a space to accommodate the collar of the ferrule of each optical cable, which is inserted in the sleeve holder 4.

Referring to FIGS. 7a and 7b, the sleeve holder 4 comprises a cylindrical metal body of brass 4b, a split sleeve 5 of stainless steel, zirconia or a spring steel such as phosphor bronze fixed in a hollow cylinder and a retainer 6 press-fitted in one end of the hollow cylinder to prevent the slipping-off of the split sleeve 5.

The cylindrical body 4b has a center collar 4a formed at its midpoint. The sleeve holder 4 can be positively held in the holder 2 by inserting the center collar 4a in the opposite notches 2e of the holder 2.

The opposite ends 4c and 4d of the sleeve holder body 4b are so shaped to be complementary with the collars 7a of the ferrules 7 of confronting optical cables as seen from FIG. 7a. FIG.8 show another sleeve holder body 4e whose opposite ends 4f and 4g are shaped to be complementary with another shape of collar 7a each of the ferrules 7.

Figure 9:
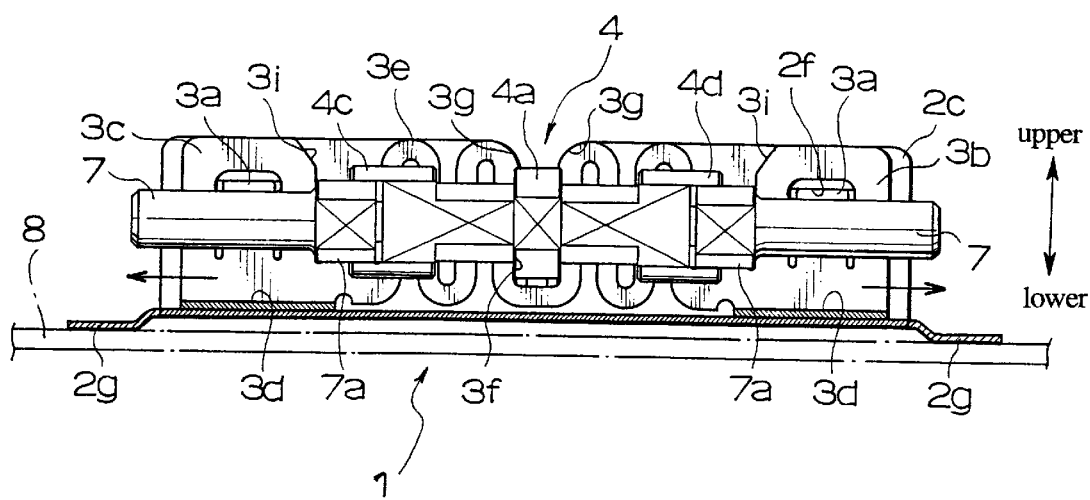
FIG. 9 illustrates how the adapter is used in connecting confronting optical cables.

Referring to FIG. 9, the manner in which confronting optical cables can be put in the end-to-end connection is described below. First, the ferrules 7 of two optical cables are inserted in the opposite open ends of the sleeve holder 4 so that their collars 7a may be fitted in the opposite recesses of the sleeve holder 4.

The sleeve holder 4 is pushed in the holder 2, which is mounted onto a printed circuit board 8. Specifically the center collar 4a of the sleeve holder 4 is press-fitted both in the center notches 2e and in the center "U" 3f of the resilient wavy form 3e to be caught by the opposite projections 3g, and at the same time, the collar 7a of each ferrule 7 is press-fitted in between the projection-and-inclination contour 3j and 3I of each "U"-shaped catch piece 3b and the outer leg side of the proximal inverted "U" of one of the opposite wavy forms 3e.

Thus, the sleeve holder 4 is positively caught by the center collar 4a in the holder 4. The distance from the outer side of one of the opposite collars 7a of the confronting ferrules 7 to the outer side of the other collar 7a (see FIG. 9) is somewhat longer than the length of the stress-free resilient means 3 from the inner side of one of the opposite "U"-shaped catch pieces 3b and 3c to the inner side of the other "U"-shaped catch piece (see FIG. 5). The press-fitting of the sleeve holder 4 in the holder 2 will make the collars 7a of the confronting ferrules 7 to stretch the resilient means 3, thus causing the catch piece 3a of each "U"-shaped catch piece 3b or 3c to depart from the inner side of the square window 2f as indicated by arrows in FIG. 9. As a counter action the confronting ferrules 7 are pushed toward the center of the holder 2 all the time under the influence of the resilient means 3, thereby positively putting the confronting ferrules 7 and 7 in end-to-end abutting and connecting condition.

Figure 10:
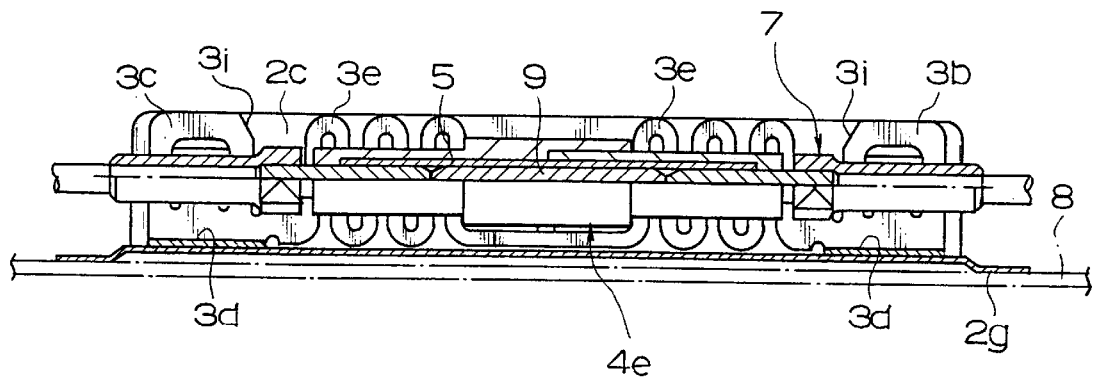
FIG. 10 illustrates how an adapter according to a second embodiment is used in connecting confronting optical cables.

Referring to FIG. 10, a sleeve holder 4e has confronting ferrules 7 and 7 fitted in its opposite ends with an attenuator ferrule 9 intervening therebetween, and the sleeve holder 4e is press-fitted in a holder 2, which is mounted onto a printed circuit board 8.

Figure 11:
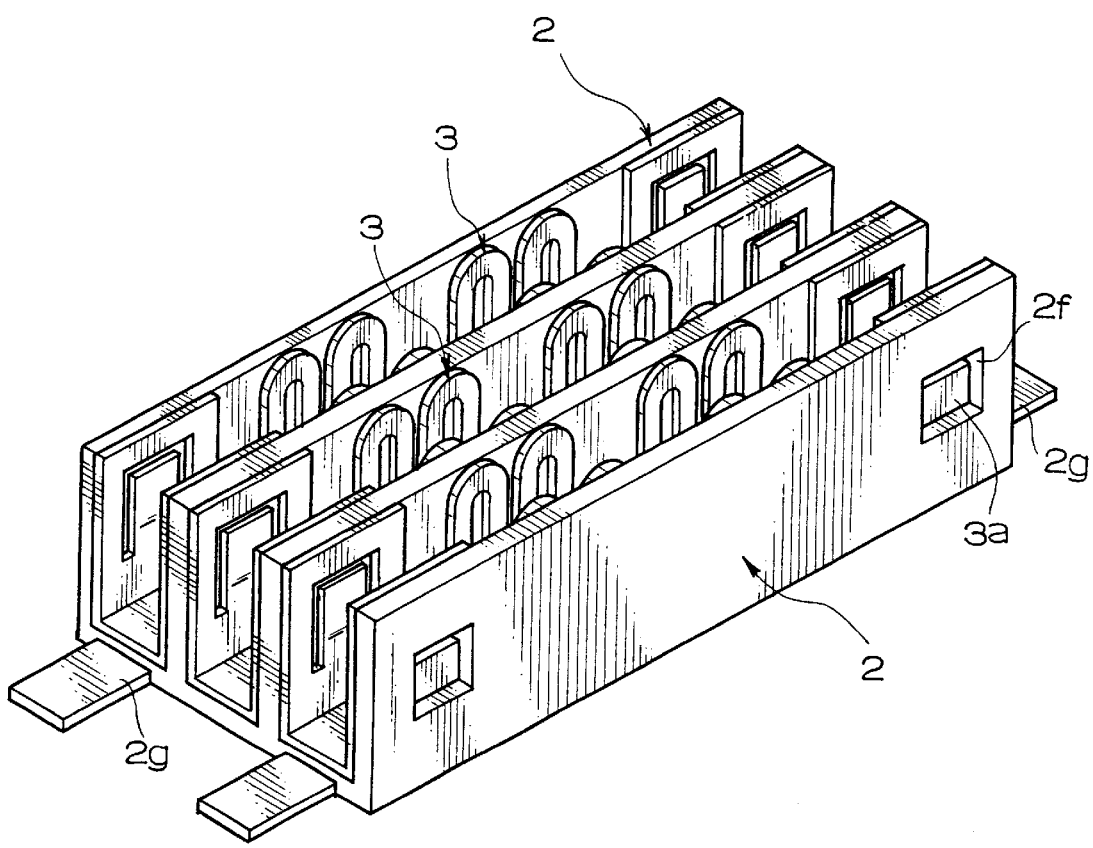
FIG. 11 is a perspective view of a parallel arrangement of holder-and-resilient means assemblies.

Referring to FIG. 11, a parallel arrangement of holders 2 has metal foots 2g partly embedded in its bottom, projecting outward from its corners. This can be injection-molded of synthetic resin, and can be advantageously used to meet the demand for installing a plurality of optical cables at an increased density.

Referring to FIGS. 12a and 12b, each of two optical cables 10 to be connected in confronting relation has a resilient means 11 allotted thereto. Specifically the "U"-shaped catch piece 11b of the resilient means 11 has wavy forms 11c extending inward, and the wavy form 11c ends with a collar pinch 11d, thereby putting the collar 7a of the ferrule 7 in position. Also, the catch piece 11 has an inclined projection 11a formed on its bottom. A holder 12 is cylindrical, and can be made of a synthetic resin or metal. It has detents 12a formed at it opposite ends. The resilient means 11 can be positively held in the holder 12 by permitting the inclined projection 11a to be caught by the detent 12a, as seen from FIG. 13.

The holder 12 may comprise a trough-like body having a "U"-shaped cross section for convenience's sake when attaching or removing the ferrule-and-resilient means assemblies from the holder 12.

As seen from FIG. 13, the catch pieces 11b of the opposite wavy forms 11c are fixed in the holder 12 by permitting the inclination projections 11a of the catch pieces 11b to be caught by the detents 12a of the holder 12 so that the collars 7a and 7a of the confronting ferrules 7 and 7 may push back the wavy forms 11c and 11c to be apart from each other in opposite directions as indicated by arrows, thereby causing the confronting ferrules 7 and 7 to be abutted on each other as counter actions to compression of the wavy forms 11c and 11c. To cause this effect the length of the wavy form measured in stress-free condition is so determined that the length "a" measured from the catch piece 11b to the projection 11e of the forward leg of the distal inverted "U" of the wavy form 11c may be shortened or compressed more or less when installed in the holder 12 as shown in FIG. 13.

As seen from FIG. 13, the catch pieces 11 of the opposite wavy forms 11c are fixed in the holder 12 by permitting the inclination projections 11a of the catch pieces 11 to be caught by the detents 12a of the holder 12 so that the collars 7a and 7a of the confronting ferrules 7 and 7 may push back the wavy forms 11c and 11c to be apart from each other in opposite directions as indicated by arrows, thereby causing the confronting ferrules 7 and 7 to be abutted on each other as counter actions to compression of the wavy forms 11c and 11c. To cause this effect the length of the wavy form measured in stress-free condition is so determined that the length "a" measured from the catch piece 11b to the projection 11e of the forward leg of the distal inverted "U" of the wavy form 11c may be shortened or compressed more or less when installed in the holder 12 as shown in FIG. 13.

As may be understood from the above, the resilient means 3 or 11 may be stretched or compressed to cause the confronting ferrules 7 and 7 to be abutted on each other as a counter action of the stretching or compressing of the resilient means, thus assuring that the confronting ferrules be put in good connection. A variety of resilient means may be used so far as they cause confronting ferrules 7 to be pushed on each other in cooperation with the collars 7a of the confronting ferrules 7.

What is claimed is:

1. An adapter for end-to-end abutting and connecting ferrules of confronting optical cables, each ferule having a collar at its rear end, the adapter comprising: a sleeve holder for containing a split sleeve in its inner space, the split sleeve having the ferrules of the confronting optical cables press-fitted therein, the sleeve holder having a center collar formed at its midpoint; and a holder for containing the sleeve holder along with the split sleeve with the sleeve holder caught by the center collar in the holder, the holder having resilient means fixed therein to grip the collars of the confronting ferrules, thereby pushing and pulling the confronting ferrules toward each other to retain the confronting optical cables in connecting position.

2. An adapter according to claim 1, wherein the holder is a trough-like holder having a U-shaped cross section, comprising an elongated bottom and two opposite upright side walls, each having center notches formed at its midpoint to catch the center collar of the sleeve holder, and catch sections formed at its opposite ends to catch engagement pieces of the resilient means, the elongated bottom of the holder having foot pieces integrally connected at its opposite ends.

3. An adapter according to claim 2, wherein the resilient means grips the collars of the confronting ferrules to push and pull the confronting ferrules toward each other, thereby making the confronting ferrules to abut on each other in the split sleeve.

4. An adapter according to claim 2, wherein the resilient means is adapted to be contained in the trough-like holder with the bottom and the side walls, and has center U-shaped sections for accommodating the center collar of the sleeve holder, each of the U-shaped sections having catch projections formed inward for catching the collar of the sleeve holder to prevent the sleeve holder from moving upward and slipping apart from the resilient means fixed in the holder, the engagement pieces projected outward from the resilient means and engaged with the catch sections of the holder, the resilient means being allowed to be laid longitudinally on the inside each of the opposite side walls, extending from each end to the midpoint of each side wall, at which midpoint the center collar of the sleeve holder is positively held.

5. An adapter for end-to-end abutting ferrules of confronting optical cables, each ferrule having a collar at its rear end, the adapter comprising: a longitudinally extending split sleeve in which the ferrules of the confronting optical cables are to be press-fitted; a longitudinally extending holder for containing the split sleeve in its inner space; and longitudinally extending resilient means which is to be caught and fixed in the holder to grip the collars of the confronting ferrules in the holder, thereby pushing the confronting ferrules toward each other to retain the confronting optical cables in connecting position.

6. An adapter according to claim 5, wherein the holder is a trough-like holder having a U-shaped cross-section, the trough-like holder comprising an elongated bottom and two opposite upright side walls.

7. An adapter according to claim 5, wherein the resilient means can grip the collars of the confronting ferrules to push the confronting ferrules toward each other, thereby making the confronting ferrules to abut on each other in the split sleeve.

8. An adapter according to claim 5, wherein the holder is a hollow cylinder.

\* \* \* \* \*